(12) United States Patent
Walker et al.

(10) Patent No.: US 11,146,419 B2
(45) Date of Patent: Oct. 12, 2021

(54) TRANSCEIVER FOR A BUS SYSTEM AND METHOD FOR REDUCING LINE-ASSOCIATED EMISSIONS

(71) Applicant: Robert Bosch GmbH, Stuttgart (DE)

(72) Inventors: Steffen Walker, Reutlingen (DE); Cyrille Brando, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/632,085

(22) PCT Filed: Jul. 18, 2018

(86) PCT No.: PCT/EP2018/069498
§ 371 (c)(1),
(2) Date: Jan. 17, 2020

(87) PCT Pub. No.: WO2019/016261
PCT Pub. Date: Jan. 24, 2019

(65) Prior Publication Data
US 2020/0169431 A1 May 28, 2020

(30) Foreign Application Priority Data
Jul. 21, 2017 (DE) .......................... 102017212543.8

(51) Int. Cl.
*H04L 12/413* (2006.01)
*H04L 12/40* (2006.01)
*H04L 25/02* (2006.01)

(52) U.S. Cl.
CPC ...... *H04L 12/413* (2013.01); *H04L 12/40013* (2013.01); *H04L 12/40039* (2013.01);
(Continued)

(58) Field of Classification Search
CPC ............. H04L 12/413; H04L 12/40013; H04L 12/40169; H04L 12/40039;
(Continued)

(56) References Cited

U.S. PATENT DOCUMENTS 5,267,251 A * 11/1993 Lenoir .................. G06F 11/076
714/43
6,839,789 B2 * 1/2005 Kramer .................. H04L 5/1461
370/492
(Continued)

FOREIGN PATENT DOCUMENTS

CN 105409175 A 3/2016
CN 106063198 A 10/2016
(Continued)

OTHER PUBLICATIONS

International Search Report for PCT/EP2018/069498, dated Sep. 28, 2018.

*Primary Examiner* — Rasheed Gidado
(74) *Attorney, Agent, or Firm* — Norton Rose Fulbright US LLP; Gerard Messina (57) ABSTRACT

A transceiver for a CAN bus system and a method for reducing line-associated emissions. The transceiver includes a transmitter for transmitting a transmitted signal to a first bus wire of a bus of the bus system, and for transmitting the transmitted signal to a second bus wire of the bus, the bus system being ensured exclusive, collision-free access of a subscriber station to the bus of the bus system at least temporarily; a receiver for receiving the bus signal transmitted on the bus wires; and an emissions reduction unit which is configured to control the signals for the bus wires on the basis of a measured level of a differential bus voltage of the signals on the bus wires, when a dominant state of the transmitted signal occurs.

11 Claims, 4 Drawing Sheets

(52) U.S. Cl.
CPC ...... *H04L 12/40169* (2013.01); *H04L 25/028* (2013.01); *H04L 2012/40215* (2013.01); *H04L 2012/40273* (2013.01)

(58) Field of Classification Search
CPC . H04L 2012/40215; H04L 2012/40273; H04L 25/028
See application file for complete search history.

(56) References Cited

U.S. PATENT DOCUMENTS

| | | | | |
|---|---|---|---|---|
| 7,356,050 | B2* | 4/2008 | Reindl | H04L 12/40032 370/489 |
| 8,681,881 | B2* | 3/2014 | Ishimaru | H04L 25/0278 375/257 |
| 9,965,426 | B2* | 5/2018 | Pihet | G06F 13/4027 |
| 10,063,391 | B2* | 8/2018 | Walker | H04L 12/4135 |
| 10,340,864 | B2* | 7/2019 | Hell | H04L 12/4625 |
| 2010/0201399 | A1* | 8/2010 | Metzner | H04L 25/028 326/83 |
| 2011/0044077 | A1* | 2/2011 | Nielsen | H02M 5/4585 363/37 |
| 2014/0330996 | A1* | 11/2014 | de Haas | H04L 12/40032 710/106 |
| 2017/0063571 | A1* | 3/2017 | Hehemann | H04L 25/028 |
| 2017/0329388 | A1* | 11/2017 | Pihet | G06F 1/26 |
| 2018/0341615 | A1* | 11/2018 | Hinderer | G06F 13/4282 |
| 2019/0089408 | A1* | 3/2019 | Humphrey | H04L 25/0276 |
| 2019/0384735 | A1* | 12/2019 | Schmitz | F21S 4/24 |

FOREIGN PATENT DOCUMENTS

| | | |
|---|---|---|
| DE | 102014204048 A1 | 9/2015 |
| EP | 2800313 A1 | 11/2014 |
| JP | 2012169905 A | 9/2012 |
| JP | 2013175915 A | 9/2013 |
| JP | 2016167812 A | 9/2016 |
| JP | 2016537881 A | 12/2016 |
| WO | 2017110056 A1 | 6/2017 |

* cited by examiner

TRANSCEIVER FOR A BUS SYSTEM AND METHOD FOR REDUCING LINE-ASSOCIATED EMISSIONS

FIELD

The present invention relates to a transceiver for a bus system and a method for reducing line-associated emissions. The bus system is, in particular, a CAN bus system. The transceiver is usable, in particular, in a CAN FD bus system and is configured to control the dominant level of the transmitted signal, in order to reduce line-associated emissions.

BACKGROUND INFORMATION

For transmission of messages or data, there are, depending on the bus system, different communications protocols for transmitting information items, which are contained in bytes or bits of the messages or data. In this connection, the information items are represented by different bit states or voltage states, which produce different bus states in response to transmission of the message via a bus of the bus system.

In the CAN bus system, for example, messages are transmitted, using the CAN and/or CAN FD protocol. The CAN bus system is used, in particular, in the communication between sensors and control units in a vehicle or in an industrial manufacturing plant, etc. In a CAN FD bus system, a data transmission rate of greater than 1 Mbit per second (1 Mbps) is possible, for example, 2 Mbit/s, 5 Mbit/s or another desired data transmission rate greater than 1 Mbit/s, etc. In addition, a CAN HS bus system (HS=high speed) is known, in which a data transmission rate of up to 500 kbit per second (500 kbps) is possible.

With CAN FD, today's CAN physical layer ISO 11898-2:2016 in the form of a CAN protocol specification requires adherence to predetermined parameters for data transmission in a CAN bus system. The differential bus voltage VDIFF during a dominant bus state is viewed as one of these parameters. In this connection, VDIFF=CAN_H−CAN_L, where CAN_H is a first bus signal and CAN_L is a second bus signal, which is generated by a transceiver of the CAN bus system from a transmission signal and is injected into two different bus lines or bus wires of a bus of the bus system. The transceiver is also referred to as a CAN transceiver or CAN FD transceiver, etc.

According to the above-mentioned ISO standard defined by the CAN physical layer ISO 11898-2:2016, in addition to a variation of the temperature, of the semiconductor processing situation, of the supply voltage, and of the reference current, differential bus voltage VDIFF must also lie in a predetermined tolerance range in response to a variation of a load resistance RL. According to Table 2 of the above-mentioned ISO Standard, a tolerance of parameter VDIFF of 1.5 V to 3.0 V is permissible in the case of a variation of load resistance RL of 50 Ohm to 65 Ohm. In the course of the development of the ISO, this parameter was expanded by a further tolerance option of load resistance RL, namely, 1.4 V to 3.3 V in the range of a load resistance RL of 45 Ohm to 70 Ohm.

According to today's state of the art, these requirements call for a transceiver design, which adheres to the above-mentioned ISO standard under all of the possibilities for variation described above. As a result of that, the typical differential bus voltage VDIFF is to be put markedly above the 1.4 V lower limit of the ISO standard, and is, today, typically 2.2 V.

However, it is problematic that the magnitude of differential bus voltage VDIFF has a direct effect on the characteristics of the bus system and the transceiver with regard to the electromagnetic compatibility (EMC). In principle, in view of actual, and thus, not ideal switching circumstances, it is accepted that a higher differential bus voltage VDIFF results in higher radiated emissions at the bus lines or bus wires, and vice versa.

SUMMARY

An object of the present invention is to provide a transceiver for a CAN bus system and a method for reducing line-associated emissions, which solve the problems mentioned above.

This object may be achieved by an example transceiver for a CAN bus system in accordance with the present invention. The transceiver includes a transmitter for transmitting a transmitted signal to a first bus wire of a bus of the bus system and for transmitting the transmitted signal to a second bus wire of the bus, in the bus system, exclusive, collision-free access of a subscriber station to the bus of the bus system being ensured at least temporarily; a receiver for receiving the bus signal transmitted on the bus wires; and an emissions reduction unit configured to control the signals for the bus wires on the basis of a measured level of a differential bus voltage of the signals on the bus wires, when a dominant state of the transmitted signal occurs.

Using the described transceiver, the emission, in particular, of stray radiation, is reduced by several dBpV. Due to this, the line-associated emissions are reduced, and the electromagnetic compatibility (EMC) of the transceiver is improved.

The control carried out by the described transceiver adapts automatically to the specific bus topology and/or present load condition. In this manner, the control is independent of the equipment variant of a vehicle. In addition, this also allows the reduction in the line-associated emissions to be easily obtained in different equipment variants of a vehicle.

A further advantage of the described transceiver is reduced power consumption during transmission. For example, in an assumed transmit mode of 50% duty cycle, on average, an approximately 5 mA lower current consumption results.

Further advantageous refinements of the transceiver are described herein.

According to one exemplary embodiment, the emissions reduction unit is configured to control a driver circuit for output stages of the transmitter on the basis of the measured level of the differential bus voltage, when a dominant state of the transmitted signal occurs.

According to a further exemplary embodiment, in order to control the signals for the bus wires, the emissions reduction unit is configured to control a resistance value of a resistor that is situated in a transmitting path between the first bus wire and a terminal for a voltage supply of the transceiver, and/or in order to control the signals for the bus wires, the emissions reduction unit is configured to control a resistance value of a resistor, which is situated in a transmitting path between the second bus wire and a terminal for grounding the transceiver.

To measure a differential bus voltage of the signals on the bus wires, the emissions reduction unit possibly includes a detector, which is connected in parallel with the inputs of a receiving comparator of the receiver. The detector may be a differential amplifier.

For the dominant bus state of the transmitted signal, it is possible for the emissions reduction unit to be configured to compare the measured level of the differential bus voltage to a setpoint value.

The transceiver is possibly a CAN FD transceiver.

The transceiver described above may be part of a bus system, which includes a bus and at least two subscriber stations that are interconnected via the bus in such a manner, that they may communicate with each other. In this connection, at least one of the at least two subscriber stations has a transceiver described above.

The above-mentioned object may also be achieved by an example method for reducing line-associated emissions in accordance with the present invention. The method is executed by a transceiver for a bus system, where exclusive, collision-free access of a subscriber station to a bus of the bus system is ensured at least temporarily. In this connection, the transceiver includes a transmitter, a receiver and an emissions reduction unit, the method including the steps: transmitting a transmitted signal to a first bus wire of the bus, using the transmitter; transmitting the transmitted signal to a second bus wire of the bus; receiving the bus signal transmitted on the bus wires, using the receiver; and controlling the signals for the bus wires, using the emissions reduction unit, on the basis of a measured level of a differential bus voltage of the signals on the bus wires, when a dominant state of the transmitted signal occurs.

The method provides the same advantages as mentioned above with regard to the transceiver.

Further possible implementations of the present invention also include combinations, not explicitly mentioned, of features or specific embodiments described above or in the following with regard to the exemplary embodiments. In this context, one skilled in the art will also add individual aspects to the specific, basic design of the present invention in the form of improvements or additions.

BRIEF DESCRIPTION OF THE DRAWINGS

Below, the present invention is described in more detail with reference to the figures and in light of exemplary embodiments.

Unless otherwise indicated, in the figures, identical or functionally equivalent elements are provided with the same reference numerals.

DETAILED DESCRIPTION OF EXAMPLE EMBODIMENTS

Figure 1:
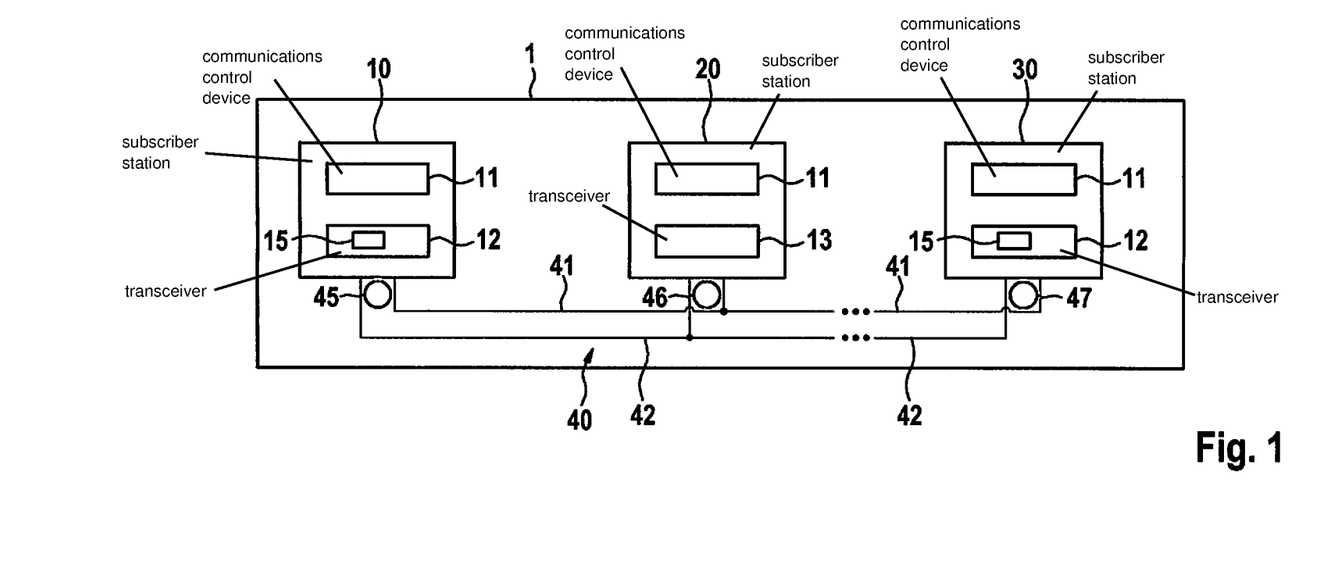
FIG. 1 shows a simplified block diagram of a bus system according to a first exemplary embodiment.

FIG. 1 shows a bus system 1, of which at least a section may be a CAN bus system, a CAN FD bus system, etc. Bus system 1 may be used in a vehicle, in particular, a motor vehicle, an airplane, etc., or in a hospital, etc.

In FIG. 1, bus system 1 includes a plurality of subscriber stations 10, 20, 30, which are each connected to a bus 40 having a first bus wire 41 and a second bus wire 42. Bus wires 41, 42 may also be called CAN_H and CAN_L and are used for injecting the dominant voltage level in the transmitting state. Via bus 40, messages 45, 46, 47 in the form of signals may be transmitted between individual subscriber stations 10, 20, 30. Subscriber stations 10, 20, 30 may be, for example, control units or display devices of a motor vehicle.

As shown in FIG. 1, subscriber stations 10, 30 each have a communications control device 11 and a transceiver 12. Transceivers 12 each include an emissions reduction unit 15. On the other hand, subscriber station 20 includes a communications control device 11 and a transceiver 13. Transceivers 12 of subscriber stations 10, 30 and transceiver 13 of subscriber station 20 are each connected directly to bus 40, even though this is not shown in FIG. 1.

Communications control device 11 is used for controlling communication, via bus 40, of the specific subscriber station 10, 20, 30 with another subscriber station of the subscriber stations 10, 20, 30 connected to bus 40. Transceiver 12 is used for transmitting and receiving messages 45, 47 in the form of signals, and, in so doing, uses emissions reduction unit 15, as described later in even more detail. Communications control device 11 may be implemented, in particular, as a conventional CAN FD controller and/or CAN controller. Otherwise, transceiver 12 may be constructed, in particular, as a conventional CAN transceiver and/or CAN FD transceiver. Transceiver 13 is used for transmitting and receiving messages 46 in the form of signals. Otherwise, transceiver 13 may be constructed as a conventional CAN transceiver.

Figure 2:
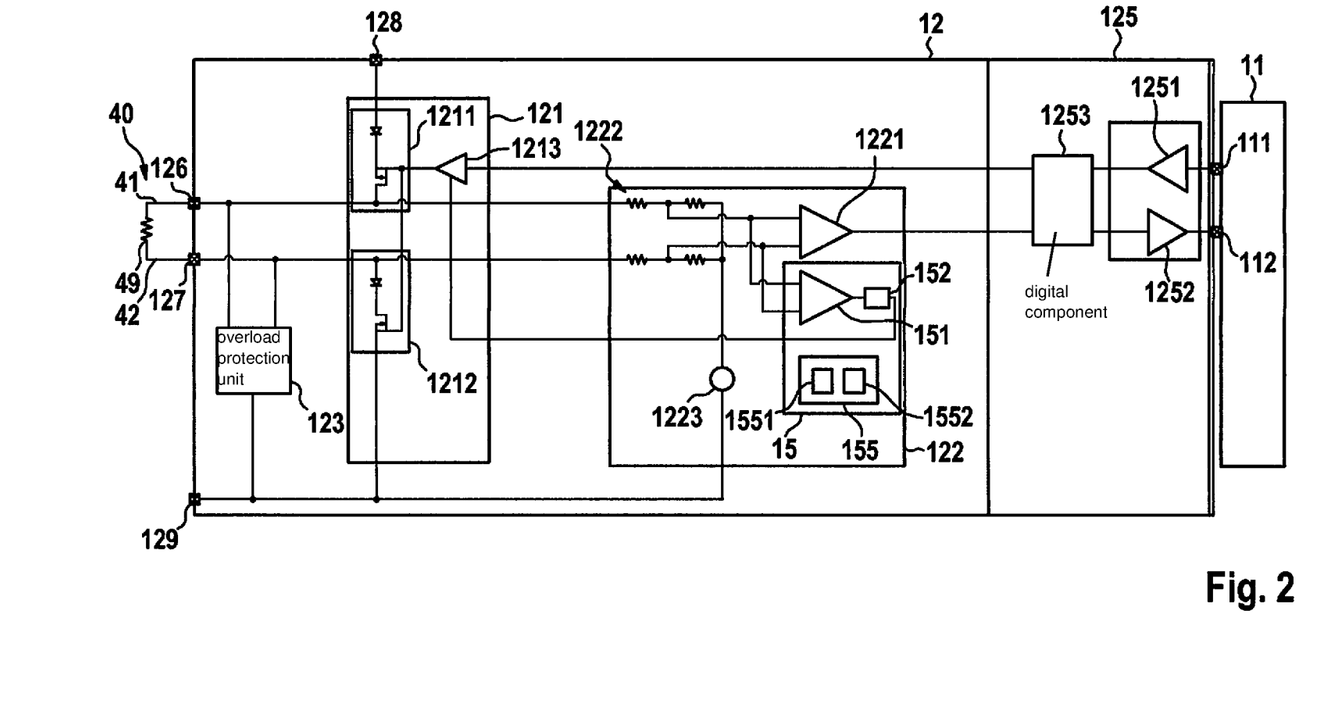
FIG. 2 shows a circuit diagram of a transceiver in the bus system according to the first exemplary embodiment.

FIG. 2 shows the basic construction of the transceiver 12 having emissions reduction unit 15. At terminals 126, 127, transceiver 12 is connected to bus 40, more specifically, to its first bus wire 41 for CAN_H and its second bus wire 42 for CAN_L. At transceiver 12, the voltage supply, in particular, CAN supply, for first and second bus wires 41, 42 takes place via a terminal 128. Transceiver 12 is connected to ground or CAN_GND via a terminal 129. In the example shown, a terminal resistor 49 is provided for terminating first and second bus wires 41, 42.

In transceiver 12, first and second bus wires 41, 42 are connected to a transmitter 121 and to a receiver 122. For protection from line-associated emissions, an overload protection unit 123, which is connected at terminals 126, 127, is provided to protect transceiver 12 against electrostatic discharge (ESD). A connecting unit 125 is connected to both transmitter 121 and receiver 122, in order to drive signals to communications control device 11 via terminals 111, 112.

To drive the signals of terminals 111, 112, connecting unit 125 has a transmitted-signal driver 1251 for a transmitted signal TxD, which is also referred to as a TxD signal and is received by communications control device 11 at terminal 111. In addition, connecting unit 125 has a received-signal driver 1252 for a received signal RxD, which is also referred to as an RxD signal. Received signal RxD is received from bus wires 41, 42 with the aid of receiver 122 and is relayed to communications control device 11 via terminal 112. Drivers 1251, 1252 are connected to transmitter 121 and to receiver 122 via a digital component 1253. Digital component 1253 may monitor signals TxD, RxD.

According to FIG. 2, transmitter 121 has a conventional output stage 1211 for the signal CAN_H for first bus wire 41, as well as a conventional output stage 1212 for the signal CAN_L for second bus wire 42. In addition, transmitter 121 has a driver circuit 1213, which is connected to emissions reduction unit 15. According to FIG. 2, a variant is shown, in which driver circuit 1211 charges the gates of output stages 1211, 1212, using a current output.

Receiver 122 has a receiving comparator 1221, whose inputs are connected in a resistive, in particular, symmetric voltage divider 1222, more specifically, its center tap; as well as a bus biasing unit 1223. In addition, in the particular example of FIG. 2, emissions reduction unit 15 is incorporated in receiver 122. Bus biasing unit 1223 supplies resistive voltage divider 1222 with a predetermined bus biasing voltage or a predetermined bus biasing potential at its one end. At its other end, resistive voltage divider 1222 is connected to first and second bus wires 41, 42.

In order to determine differential bus voltage VDIFF, the pre-existing layout for data recognition of receiver 122 is used. The bus signals of first and second bus wires 41, 42 are subdivided by a factor of 30 to 50 with the aid of resistive voltage divider 1222, in order to supply a usable signal to low-voltage receiving comparator 1221.

Emissions reduction unit 15 has a detector 151, an evaluation and control unit 152 and a storage unit 155. Emissions reduction unit 15, more specifically, its detector 151, uses the tapping points available to receiving comparator 1221, in order to measure, and therefore, to identify, the level of differential bus voltage VDIFF, using detector 151. Therefore, the inputs of receiving comparator 1221 are connected in parallel with the inputs of detector 151.

The measuring result of detector 151 is supplied to evaluation and control unit 152. In addition, the measuring result of detector 151 may be stored in storage unit 155 in the form of a measured value or actual value 1551. Evaluation and control unit 152 is configured to ascertain the amount of deviation from a setpoint value 1552, which is stored in storage unit 155. In other words, evaluation and control unit 152 is configured to compare the measured value of the level of differential bus voltage VDIFF, that is, actual value 1551, to a setpoint value 1552 for the level of differential bus voltage VDIFF. Therefore, on the basis of the measuring result of detector 151, emissions reduction unit 15, more specifically, its evaluation and control unit 152, checks whether or not measured, actual value 1551 of the level of differential bus voltage VDIFF deviates from setpoint value 1552 for the level.

In addition, evaluation and control unit 152 is configured to influence the driver circuit 1213 for output stages 1211, 1212 of transmitter 121, more specifically, its transistors, in such a manner, that the level of differential bus voltage VDIFF is adjusted to setpoint value 1552. In this context, emissions reduction unit 15 ensures that in the case of changing bus loading, namely, in the range of 45 to 70 Ohm, the level of differential bus voltage VDIFF is always set as low as possible, but safely over the presently required minimum value from the specification in the CAN physical layer ISO 11898-2:2016, that is, over 1.4 V or 1.5 V. However, if necessary, the minimum value may also be set to a different value.

Detector 151 may be constructed as a differential amplifier, whose output, which corresponds to actual value 1551, is compared to a reference value in the form of setpoint value 1552. Driver circuit 1213 for output stages 1211, 1212 of transmitter 121 may be implemented, for example, as a reference path of a current mirror circuit, whose outputs are transistors that transmit to respective bus wires 41, 42. These transistors in the form of outputs of the current mirror circuit are illustrated in FIG. 2. The action of emissions reduction unit 15 or of its detector 151 may be that the reference currents of the current mirror circuits are varied and, therefore, that the level of differential bus voltage VDIFF is varied.

In the following, the operation of the transceiver 12 according to FIG. 2 is also explained in more detail in light of the signal characteristics of FIG. 3 through FIG. 6.

Figure 3:
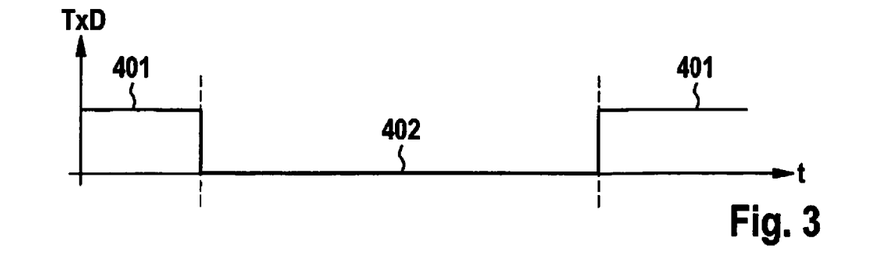
FIG. 3 shows a time characteristic of a transmitted signal TxD in a transceiver according to the first exemplary embodiment.
Figure 4:
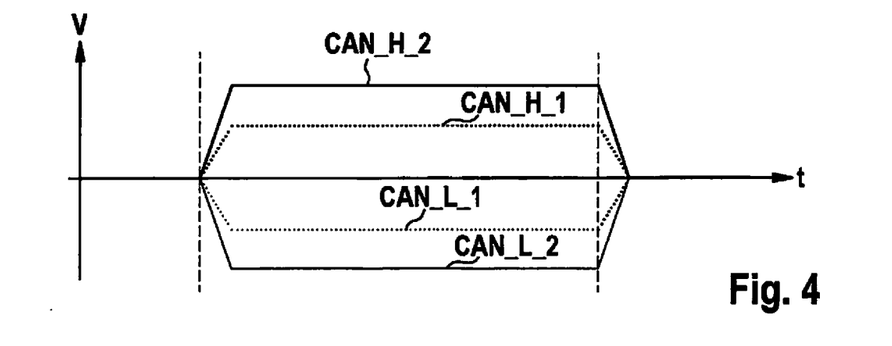
FIG. 4 shows a time characteristic of bus signals CAN_H and CAN_L in the transceiver according to the first exemplary embodiment, in comparison with a time characteristic of the bus signals in a conventional transceiver.
Figure 5:
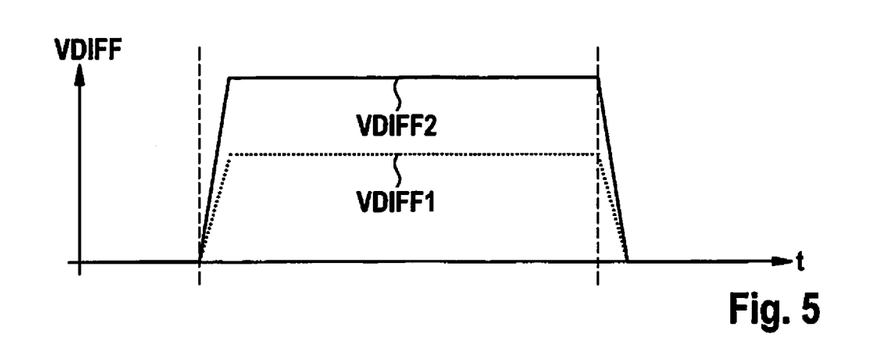
FIG. 5 shows a time characteristic of a differential voltage VDIFF of bus signals CAN_H and CAN_L in the transceiver according to the first exemplary embodiment, in comparison with a time characteristic of differential voltage VDIFF in a conventional transceiver.
Figure 6:
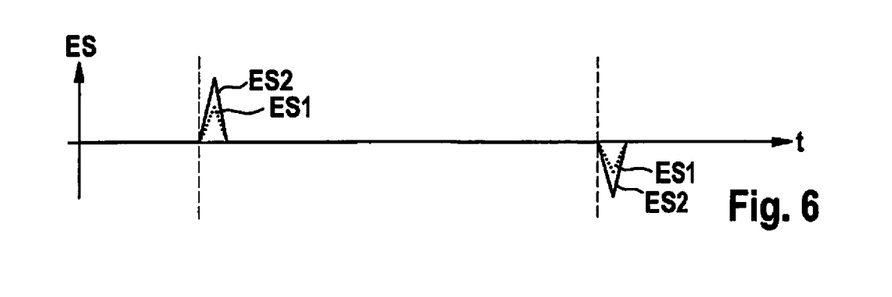
FIG. 6 shows a time characteristic of an emissions signal ES in the transceiver according to the first exemplary embodiment, in comparison with a time characteristic of an emissions signal ES in the conventional transceiver.

FIG. 3 through FIG. 6 each show a time characteristic of signals in the transceiver 12 according to the present exemplary embodiment. In this connection, signals, which are represented in FIG. 4 through FIG. 6, set in as a result of a transmitted signal TxD shown in FIG. 3. In FIG. 4 through FIG. 6, in each instance, a corresponding signal characteristic in a conventional transceiver, such as transceiver 13 of subscriber station 20, is additionally shown for the sake of comparison. In this case, the signal characteristics for transceiver 12 according to the present exemplary embodiment are each represented as a dotted line. On the other hand, the signal characteristics for transceiver 13 are each represented as a solid line.

In transmitted signal TxD of FIG. 3, in the course of time t, a change of state from a first bus state 401 to a second bus state 402, and then back to first bus state 401 again, takes place in three consecutive bits. First bus state 401 may also be referred to as a recessive state or higher level. Second bus state 402 may also be referred to as a dominant state or lower level. As a result of transmitted signal TxD of FIG. 3, voltage V sets in for signals CAN_H and CAN_L, as shown in FIG. 4. In this case, signals CAN_H_1 and CAN_L_1 set in in transceiver 12. On the other hand, signals CAN_H_2 and CAN_L_2 set in in transceiver 13. As a result of this, a differential voltage VDIFF=CAN_H−CAN_L sets in, as shown in FIG. 5. In this connection, a differential voltage VDIFF 1=CAN_H_1−CAN_L_1 sets in in transceiver 12. On the other hand, in transceiver 13, a differential voltage VDIFF 2=CAN_H_2−CAN_L_2 sets in, as shown in FIG. 5. In addition, an emissions signal ES, as shown in FIG. 6, sets in as a result of the above-mentioned signal characteristics. In this case, an emissions signal ES1 sets in in transceiver 12. An emissions signal ES2 sets in in transceiver 13.

For transceivers 12, 13, the comparison of the signals from FIG. 4 through FIG. 6 clearly shows that in the case of the same transmitted signal TxD, transceiver 12 according to the present exemplary embodiment has a markedly lower differential bus signal VDIFF in dominant bus state 402. In addition, the comparison shows that in transceiver 12, emissions signal ES1 has markedly lower peaks after a change of state from recessive to dominant, and in response to a change of state from dominant to recessive.

Consequently, transceiver 12 according to the present exemplary embodiment has line-associated emissions, which are markedly lower than the line-associated emissions of a conventional transceiver, that is, transceiver 13.

Evaluation and control unit 152 is configured in such a manner, that during operation of transceiver 12 of FIG. 2, the control action only takes place, in principle, during transmission, and when a dominant bus state, that is, a second bus state 402, is present. Thus, it must be true that transmitted signal TxD has a dominant bit state. Consequently, evaluation and control unit 152 only switches driver circuit 123 for output stages 1211, 1212 on, if a predetermined bus state is present. In other words, emissions reduction unit 15, more specifically, its evaluation and control unit 152, is configured in such a manner, that connecting unit 123 is or is not switched on as a function of the measuring result of detector 151 of emissions reduction unit 15.

The control of the levels of differential bus voltage VDIFF may initially take place, for example, after the start-up of transceiver 12. In addition, or as an alternative, control of the levels of differential bus voltage VDIFF may take place from message 45, 47 to message 45, 47. In the cases mentioned, the set value of driver circuit 1213 last used is always stored.

Consequently, using transceiver 12, a method for reducing line-associated emissions is executed with the aid of emissions reduction unit 15.

FIG. 4 shows a transceiver 120 according to a second exemplary embodiment.

Figure 7:
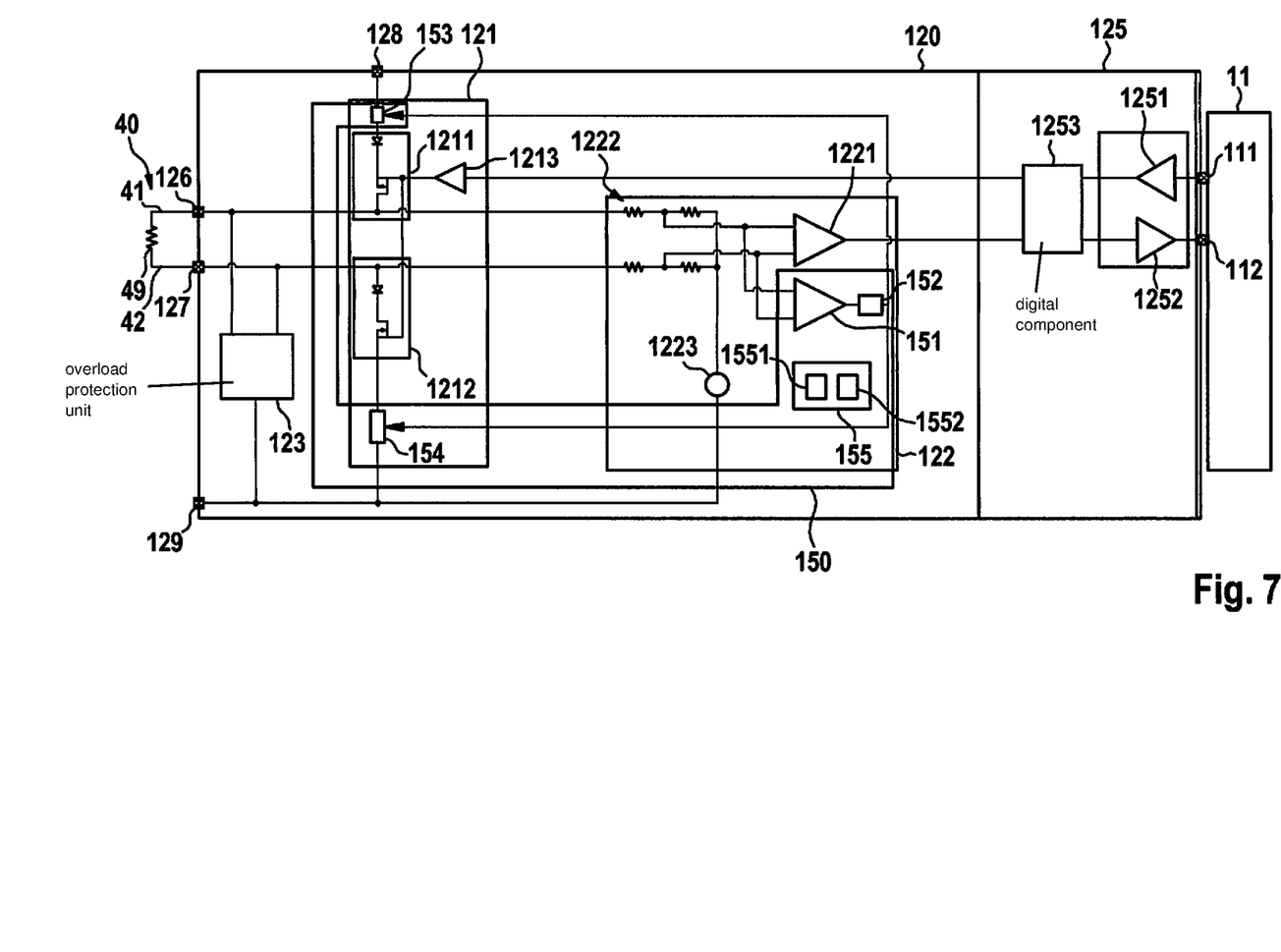
FIG. 7 shows a circuit diagram of a transceiver in a bus system according to a second exemplary embodiment.

FIG. 7 shows the basic layout of a transceiver 120 according to a second exemplary embodiment. Transceiver 120 includes an emissions reduction unit 150. With the exception of the differences described below, bus system 1 and transceiver 120 are constructed in the same manner as described above in accordance with the previous exemplary embodiment regarding transceiver 12.

In addition, emissions reduction unit 150 has a resistor 153 in the transmitting path between first bus wire 41 for CAN_H and terminal 128 for CAN_SUPPLY. Furthermore, emissions reduction unit 150 has a resistor 154 in the transmitting path between second bus wire 42 for CAN_L and terminal 129 for CAN_GND.

Resistors 153, 154 are each configured in such a manner, that their resistance value may be changed. For example, resistors 153, 154 may each take the form of a potentiometer.

Emissions reduction unit 150, more specifically, its evaluation and control unit 152, is configured in such a manner, that evaluation and control unit 152 makes a change in the resistance value of resistor 153 and/or a change in the resistance value of resistor 154 as a function of the measuring result of detector 151.

Consequently, the same signals set in, as are described above for transceiver 12 with regard to FIG. 3 through FIG. 6. Therefore, the emissions reduction unit 150 according to the second exemplary embodiment provides the same advantages as mentioned with regard to transceiver 12 and/or its emissions reduction unit 15 according to the preceding exemplary embodiment.

All of the above-described refinements of emissions reduction units 15, 150 of transceivers 12, 120 of subscriber stations 10, 20, 30 of bus system 1, and of the method executed in them in accordance with the first and second exemplary embodiment, as well as their modifications, may be used individually or in all possible combinations. In addition, the following modifications are particularly possible.

The above-described bus system 1 according to the first and second exemplary embodiments is described in light of a bus system based on the CAN protocol. However, the bus system 1 according to the first and/or second exemplary embodiment may also be a different type of communications network. It is advantageous, but not necessarily a requirement, that in bus system 1, exclusive, collision-free access of a subscriber station 10, 20, 30 to bus line 40 or to a common channel of bus line 40 be ensured for at least certain time spans.

Bus system 1 according to the first and/or second exemplary embodiment, as well as its modifications, is, in particular, a CAN network or a CAN HS network or a CAN FD network or a FlexRay network. However, bus system 1 may also be a different serial communications network.

The number and set-up of subscriber stations 10, 20, 30 in bus system 1 according to the first and second exemplary embodiments and their modifications is arbitrary. In particular, only subscriber stations 10 or subscriber stations 20 or subscriber stations 30 may also be present in bus systems 1 of the first or second exemplary embodiment. Irrespective of this, only emissions reduction units 15 or only emissions reduction units 150 according to the different embodiment variants described above may also be present.

The functionality of the exemplary embodiments described above may be implemented in a transceiver 12, 13 or a CAN transceiver or a transceiver chipset or a CAN transceiver chipset, etc. Additionally or alternatively, it may be integrated in existing products. In particular, it is possible for the considered functionality to either be implemented in the transceiver in the form of a separate electronic chip or to be embedded in an integrated, overall solution, in which only one electronic chip is present.

What is claimed is:

1. A transceiver of a station of a bus system, comprising:
   a transmitter connected to a first bus wire of a bus of the bus system and to a second bus wire of the bus, wherein, in the bus system, exclusive, collision-free access of a subscriber station to the bus of the bus system is ensured at least temporarily; and
   a receiver that includes a comparator and a controller and that is connected to the first and second bus wires so that a received signal from another station can be obtained from the first and second bus wires;
   wherein, when a dominant state of a transmitted signal that is transmitted by the station to another station via the first and second bus wires occurs, the controller is configured to reduce a difference, measured by the comparator, between (a) a voltage level of the transmitted signal as placed by the transmitter onto the first bus wire and (b) a voltage level of the transmitted signal as placed by the transmitter onto the second bus wire, as long as the measured difference is determined to be above a predefined value.

2. The transceiver as recited in claim 1, wherein the transmitted includes a driver circuit for output stages of the and the control performed by the controller includes influencing the driver circuit.

3. The transceiver as recited in claim 1, wherein the controller includes a resistor situated in a transmitting path between the first bus wire and a terminal for a voltage supply of the transceiver, and the reducing of the difference includes controlling a resistance value of the resistor.

4. The transceiver as recited in claim 1, wherein the controller includes a resistor situated in a transmitting path between the second bus wire and a terminal for grounding the transceiver, and the reducing of the difference includes controlling a resistance value of the resistor.

5. The transceiver as recited in claim 1, wherein the comparator is connected in parallel with inputs of a receiving comparator of the receiver for the received signal.

6. The transceiver as recited in claim 5, wherein the comparator is a differential amplifier.

7. The transceiver as recited in claim 1, wherein the transceiver is a CAN FD transceiver.

8. The transceiver as recited in claim 3, wherein the transmitter includes a transistor influenced by the resistor.

9. The transceiver as recited in claim 4, wherein the transmitter includes a transistor influenced by the resistor.

10. A bus system, comprising:
- a bus;
- at least two subscriber stations interconnected by the bus in such a manner that they may communicate with each other;

wherein:
- each respective one of at least one of the at least two subscriber stations includes a transceiver, the transceiver including:
  - a transmitter connected to a first bus wire of the bus and to a second bus wire of the bus; and
  - a receiver that includes a comparator and a controller and that is connected to the first and second bus wires so that a received signal from another of the at least two subscriber stations can be obtained from the first and second bus wires;
- when a dominant state of a transmitted signal that is transmitted by the respective subscriber station to the other of the at least two subscriber stations via the first and second bus wires occurs, the controller is configured to reduce a difference, measured by the comparator, between (a) a voltage level of the transmitted signal as placed by the transmitter onto the first bus wire and (b) a voltage level of the transmitted signal as placed by the transmitter onto the second bus wire, as long as the measured difference is determined to be above a predefined value; and
- in the bus system, exclusive, collision-free access of a subscriber station to the bus of the bus system is ensured at least temporarily.

11. A method for reducing line-associated emissions, the method being executed by a transceiver for a bus system, where exclusive, collision-free access of a subscriber station to a bus of the bus system is ensured at least temporarily, the transceiver including a transmitter and a receiver that includes a comparator and a controller, the method comprising the following steps:
- transmitting a transmitted signal to a first bus wire of the bus, using the transmitter;
- transmitting the transmitted signal to a second bus wire of the bus;
- receiving a bus signal transmitted on the first and second bus wires, using the receiver; and
- when a dominant state of the transmitted signal occurs, the controller reducing a difference, measured by the comparator, between (a) a voltage level of the transmitted signal as placed by the transmitter onto the first bus wire and (b) a voltage level of the transmitted signal as placed by the transmitter onto the second bus wire, the reduction being performed as long as the measured difference is determined to be above a predefined value.

* * * * *